United States Patent [19]
Eller

[11] Patent No.: US 6,201,174 B1
[45] Date of Patent: Mar. 13, 2001

(54) METHOD AND SYSTEM FOR IMPROVED TABLATURE NOTATION IN DIGITAL MUSIC SCORES

(75) Inventor: Marlin Eller, Seattle, WA (US)

(73) Assignee: Sunhawk.com Corporation, Seattle, WA (US)

( * ) Notice: Subject to any disclaimer, the term of this patent is extended or adjusted under 35 U.S.C. 154(b) by 0 days.

(21) Appl. No.: 09/211,163

(22) Filed: Dec. 11, 1998

(51) Int. Cl.[7] .................................................. G09B 15/02
(52) U.S. Cl. ...................... 84/477 R; 84/454; 84/470 R; 84/475; 84/483.2
(58) Field of Search .............................. 84/454–455, 467, 84/470 R, 475, 477 R, 478, 483.1, 483.2, 485 R, 609–613, 619, 634–637

(56) References Cited

U.S. PATENT DOCUMENTS

| 5,085,116 | | 2/1992 | Nakata et al. |
|---|---|---|---|
| 5,524,522 | * | 6/1996 | Hesnan .................................. 84/473 |
| 5,533,903 | * | 7/1996 | Kennedy ................................ 84/610 |
| 5,585,583 | | 12/1996 | Owen . |
| 5,639,977 | | 6/1997 | Hesnan . |
| 5,690,496 | * | 11/1997 | Kennedy ................................ 84/610 |

FOREIGN PATENT DOCUMENTS

WO 97/46991    12/1997  (WO) .

OTHER PUBLICATIONS

Noad, Frederick, "The Virtual Guitarist," Chapter 3, pp. 16–56, Schirmer Books, New York, New York, 1998.
Alexander, John, "Passport Software is Alive and Well," http://www.digital.com/cgi–bin/news?msg@48492@comp%2emusic%2emidi%26Passport+Designs [Accessed Aug. 30, 1998].
Wright, Howard, "The Guide to Tab Notation: How to Read and Write Tab," http://www.oagl.com/tab/tab_faq.html [Accessed Aug. 19, 1998].
Resnicoff, Matt, "Picking and Strumming Lessons via Disk," The New York Times, Sep. 3, 1998.
Resnicoff, Matt, "A Well–Paced Music Tutorial," The New York Times, Sep. 3, 1998.
Resnicoff, Matt, "Good Program for Beginners, Though Short on Notation," The New York Times, Sep. 3, 1998.

(List continued on next page.)

Primary Examiner—Robert E. Nappi
Assistant Examiner—Marlon Fletcher
(74) Attorney, Agent, or Firm—Perkins Coie LLP

(57) ABSTRACT

A computerized tablature composer automatically updates a tablature notation following edits of a corresponding staff notation. The computerized tablature composer conversely links edits to a tablature notation with corresponding updates in a staff notation for a corresponding musical score. The computerized tablature composer ensures vertical alignment between corresponding notes in a staff notation and a tablature notation. The computerized tablature composer ensures that the actual played notes in both musical representations are aligned so that the musician knows which note in the staff notation corresponds to which note in the tablature notation. The computerized tablature composer further allows the coupling between tablature and conventional staff notation to be de-coupled upon request. The computerized tablature composer provides a musician with alternate fret locations for the notes in a musical work when the musician indicates an alternate string for a given note. The computerized tablature composer provides a virtual tuning peg that allows a musician to use non-standard tunings by changing the fret numbers in the tablature notation to reflect new tuning data for one or more strings represented by the tablature notation.

49 Claims, 14 Drawing Sheets

OTHER PUBLICATIONS

Resnicoff, Matt, "Lots of On–Screen Options and a Band to Back You Up," The New York Times, Sep. 3, 1998.

Olga—Guitar Related Software, http://www.olga.net/software.html [Accessed Aug. 30, 1998].

Resicoff, Matt, "Guitropolis—A Lighthearted Approach, But a Solid Information Base," The New York Times, Sep. 3, 1998.

"Passport Design Lives!" http://www.gvox.com/press/index.html [Accessed Aug. 30, 1998].

GVOX Guitar Master, http://www.gvox.com/guitar.dir/index.html [Accessed Aug. 30, 1998].

GVOX Software, http://www.gvox.com/windows/wintech.html [Accessed Aug. 30, 1998].

GVOX Troubleshooting, http://www.gvox.com/trouble.html [Accessed Aug. 30, 1998].

GVOX Frequently Asked Questions, http://www.gvox.com/techbody.html [Accessed Aug. 30, 1998].

GVOX Downloads, http://www.gvox.com/downloads.html [Accessed Aug. 30, 1998].

GVOX Company Information, http://www.gvox.com/info.html [Accessed Aug. 30, 1998].

GVOX Fact Sheet, http://www.gvox.com/information/factsheet.html [Accessed Aug. 30, 1998].

G–VOX Guitar™ Connects Your Guitar to Your Computer, http://www.gvox.com/information/guitarpr.html [Accessed Aug. 30, 1998].

"Guitar 101: The Fender Method," http://www.gvox.com/information/guitar101.html [Accessed Aug. 30, 1998].

"New G–VOX Guitar Peripheral Selling Strong at Nation's Leading Mass Merchandisers," http://www.gvox.com/information/gvoxpr.html [Accessed Aug. 30, 1998].

G–Vox Cool Links, http://www.gvox.com/links.html [Accessed Aug. 30, 1998].

Passport Notation Software, http://web1.pmci.com/'bbshop/passport.html [Accessed Aug. 30, 1998].

* cited by examiner

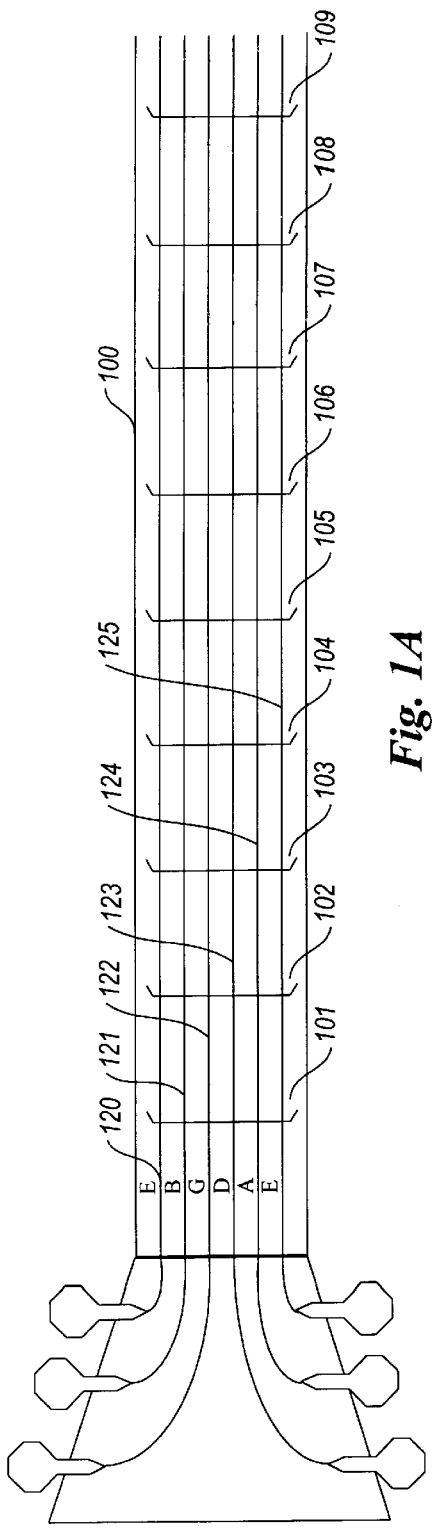
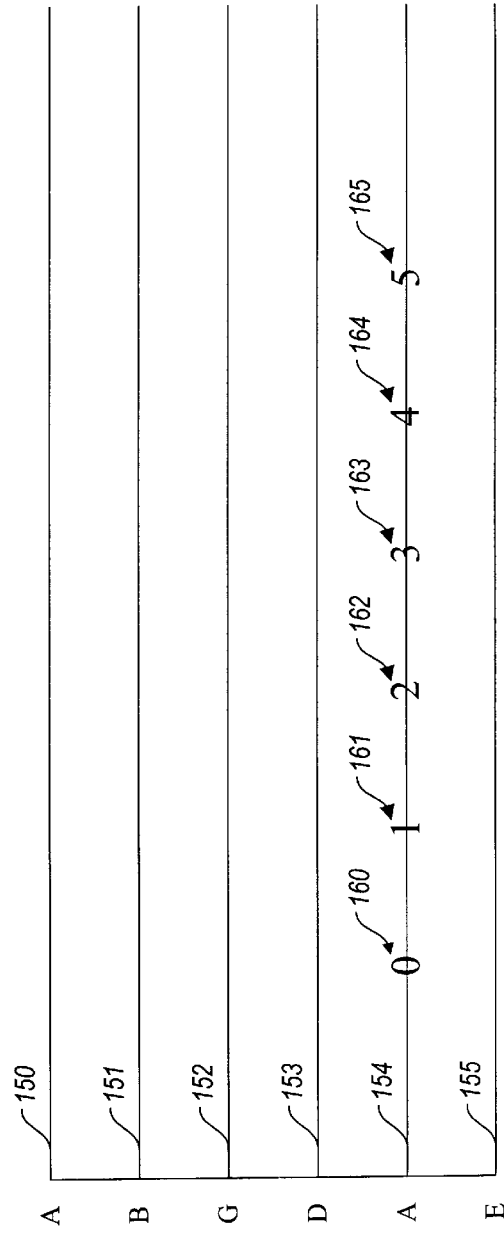
*Fig. 1A*
*Prior Art*
*Fig. 1B*

METHOD AND SYSTEM FOR IMPROVED TABLATURE NOTATION IN DIGITAL MUSIC SCORES

TECHNICAL FIELD

The present invention relates to digital music, and in particular, to an editing system that provides enhanced tablature representations for digital musical scores.

BACKGROUND OF THE INVENTION

Recorded music has conventionally existed in human-readable and machine-readable forms. Human-readable music typically comprises a text, known as sheet music, containing written symbols that represent the sounds in a musical composition. Machine-readable music can be represented in many different formats based on the machine that is to play the music. For example, the Musical Instrument Digital Interface ("MIDI") standard specifies that aspects of music, such as pitch and volume, are encoded in 8-bit bytes of digital information.

Musicians have developed various musical notation systems for human-readable sheet music over the course of many centuries. The standard staff notation, based upon a staff (or stave) of five lines, represents the predominate musical notation system in Western music. Each line, and each space between the lines, comprises a different pitch. Notes representing a tone of a given pitch may be placed on a line or in a space. A clef, positioned at the beginning of every staff, indicates the pitch assigned to one of the lines, e.g., a treble clef and a base clef.

A musical notation system needs to suit the music it represents. Accordingly, musicians have developed other human-readable notational systems for particular types of music and particular instruments. The tablature staff, or "tab," comprises a human-readable notational system for representing music played on stringed instruments, such as a guitar or a bass. Rather than utilizing the symbols found in the conventional staff notation, tablature uses ordinary text characters and numbers to represent a musical score. Tablature tells the musician what notes to play by indicating which string should be struck and the effective length of the string. The effective length of the string is typically changed by placing a finger on the string so that vibration of the struck string stops at the placement of the finger. Some stringed instruments have frets to assist in the changing of the effective length of the string. A fret represents one of series of ridges fixed across a stringed instrument's fingerboard, such as the 24 frets commonly affixed on the neck of a guitar. In the following, the term "fretting" refers to the changing of the effective length of a string, whether the instrument has actual frets (e.g., a guitar) or not (e.g. a bass). Tablature may also tell the musician where hammerons, pull-offs, bends, slides, harmonics, and vibrato occur in a musical score. Tablature may even indicate an appropriate tuning for a musical score.

Tablature provides a music notation system that is rather simple for a musician to read because tablature corresponds to the six strings stretched across a guitar's long fretted neck. As shown in FIG. 1A, a musician conventionally tunes strings 120–125 of a guitar 100 as E, A, D, G, B, and E. The musician conventionally tunes the strings 120–125 upward from E, one line below the base clef of the conventional staff notation, to another E, the first line of the treble clef in the conventional staff notation. A musician plays a guitar by plucking the strings 120–125 with the fingers of the right hand while those of the left hand close various frets 101–109 to produce different tones and chords.

Tablature, such as that shown in FIG. 1B, utilizes lines 150–155 corresponding to the strings of a stringed instrument, e.g., the strings 120–125 of the guitar 100. The line 150 represents the highest pitch string (conventionally tuned to E), and the line 155 represents the lowest pitch string (conventionally tuned to a lower E). As shown in FIG. 1B, the tuning (E, A, D, G, B, E) for the lines 150–155 conventionally appears on the left side of the tablature notation.

Musical notes 160–165 written as numbers on the lines 150–155 tell the musician where to fret a string with the left hand. In tablature, a zero, such as a zero 160, indicates that a string should be played "open" and not fretted. As in the conventional staff notation, the musician reads a tablature notation from left to right to reveal an order in which the notes 160–165 should be played. The illustrated tablature notation of FIG. 1B indicates the sequence of the notes 160–165 to be played on the A string by moving up one fret at a time, e.g., playing first the open A string 124 of the guitar 100, then playing the A string 124 at the fret 101, followed by playing the A string 124 at the fret 102, and concluding by playing the A string 124 at the fret 105.

FIG. 1B illustrates a tablature notation in which the musician plays the notes 160–165 one at a time. Of course, a musician may play multiple notes together on a stringed instrument, and FIG. 2 illustrates a tablature notation that tells the musician when to play notes together in a musical score. Tablature notation indicates when the musician should play two or more notes together by writing one note on top of another, e.g., a note 202 over a note 201. The tablature notation shown in FIG. 2 represents a G-bar chord 207 by indicating that the musician should play the third fret of the E string 155 (the note 201) together with the fifth fret of the A string 154 (the note 202), the fifth fret of the D string 153 (a note 203), the fourth fret of the G string 152 (a note 204), the third fret of the B string 151 (a note 205), and the third fret of the E string 150 (a note 206). Thus, this tablature notation directs the musician to play the notes 201–206 together as the G-bar chord 207.

FIG. 3 shows the G-bar chord 207 of FIG. 2 written in a slightly different manner. The tablature notation showed in FIG. 3 indicates that the musician should strum the G-bar chord 207 starting at the E string 155 so that each string is hit slightly later than its preceding string, although all the notes 201–206 will ring together. Writing the notes 201–206 shown in FIG. 3 closer together signals the musician that the strings 150–155 should be strummed quickly while writing the notes 201–206 farther apart signals the musician to strum the strings 150–155 more slowly.

Tablature provides the musician with an indication of a musical score's rhythm, i.e., tablature tells the musician which notes are long and which are short. Nevertheless, tablature does not provide a musician with as precise an indication of a musical note's length as the notes provided by the conventional staff notation. Tablature also does not tell the musician which fingers should be used to fret which notes. In addition, tablature also does not normally provide information regarding picking and strumming, leaving these choices to the musician.

As illustrated by FIG. 4, tablature notation provides a musician with information regarding the relative lengths of the notes in a musical score only. Accordingly, a musician must often listen to a song to pick up its rhythm. Nevertheless, tablature provides the musician with some indications of timing. As a general rule, the spacing of notes in tablature tells the musician which notes are the long ones and which notes are the fast ones. For example, when a musician compares notes 401 and 402 shown in FIG. 4 with notes 403 and 404, the musician can determine a relative length for these notes, e.g., the note 401 is longer than the note 403.

Tablature notation also includes extra letters or symbols written between notes that indicate how the musician should play the notes. Table 1 provides some of the more commonly encountered symbols.

TABLE 1

| Symbol | Meaning |
| --- | --- |
| H | Hammer-On |
| P | Pull-Off |
| B | Bend String Up |
| R | Release Bend |
| / | Slide Up |
| \ | Slide Down |
| V | Vibrato |
| T | Write Hand Tap |
| X | Play note with heavy damping |

No single tablature convention exists, with many tablature variations diverging considerably. Tablature nevertheless provides a rich system for indicating musical notations to musicians playing stringed instruments. Of course, tablature notation may represent additional complexities in a musical score than have been discussed herein, and an interested reader is directed towards one of the many fine tablature reference works that have been composed since tablature's beginnings in the 13th century.

Musicians are increasingly using computer-based editing tools to compose and edit musical scores. For example, some systems may even teach methods for preparing a tablature notation for a musical score from a corresponding conventional staff notation. Unfortunately, the current computer-based systems for editing musical works expressed in tablature have not achieved the sophistication found in music editing systems for musical works expressed in the conventional staff notation. Accordingly, many tablature notations published alongside a corresponding conventional staff notation for the same musical score often do not coincide, causing great frustration for musicians attempting to master the underlying musical work. Present tablature notations also tend to be unduly rigid, forcing musicians to conform to the tablature notation expressed, rather than providing a tablature notation containing comfortable fret locations for the musician. Thus, musicians would benefit from improved tablature editing and preparation tools in computer-based music editing and composing systems.

SUMMARY OF THE INVENTION

The invention provides a method and system for producing an enhanced tablature notation for a musical score corresponding to a musician's alterations to an instrument used to perform the musical score, changes in the musician's method for performing the musical score, and alterations to the musical score's conventional staff notation.

A computerized tablature composer provides a virtual tuning peg that automatically updates a musical score's tablature notation following a musician's re-tuning of one or more of the strings represented by the tablature notation. The computerized tablature composer tracks non-standard instrument tunings by allowing the fret numbers (e.g., effective string length) indicated in the tablature notation to change based upon the instrument tuning indicated by the musician, according to an embodiment of the invention.

The computerized tablature composer further receives a musician's instructions regarding performance of the musical score on a stringed instrument using non-standard fret locations. In accordance with such instructions, the computerized tablature composer provides the musician with alternate fret locations in the tablature notation corresponding to the musician's desire to perform the musical score by playing one or more notes on an alternate string, according to an embodiment of the invention.

The computerized tablature composer automatically updates a tablature notation for a musical score following editing of a corresponding conventional staff notation. Conversely, the computerized tablature computer updates the conventional staff notation following edits of the tablature notation. The computerized tablature composer further allows the coupling between the tablature notation and the conventional staff notation to be de-coupled upon request.

Embodiments of the computerized tablature composer ensure vertical alignment between a note in the conventional staff notation and its corresponding note in the tablature notation. The computerized tablature composer ensures alignment between the actual played notes in both musical representations so that a musician can easily recognize which note in the conventional staff notation corresponds to which note in the tablature notation.

BRIEF DESCRIPTION OF THE DRAWINGS

FIG. 1A illustrates the strings and frets associated with a conventional stringed instrument, such as a guitar.

FIG. 1B illustrates a tablature notation having lines corresponding to the strings shown in FIG. 1A.

DETAILED DESCRIPTION OF THE INVENTION

Figure 2:
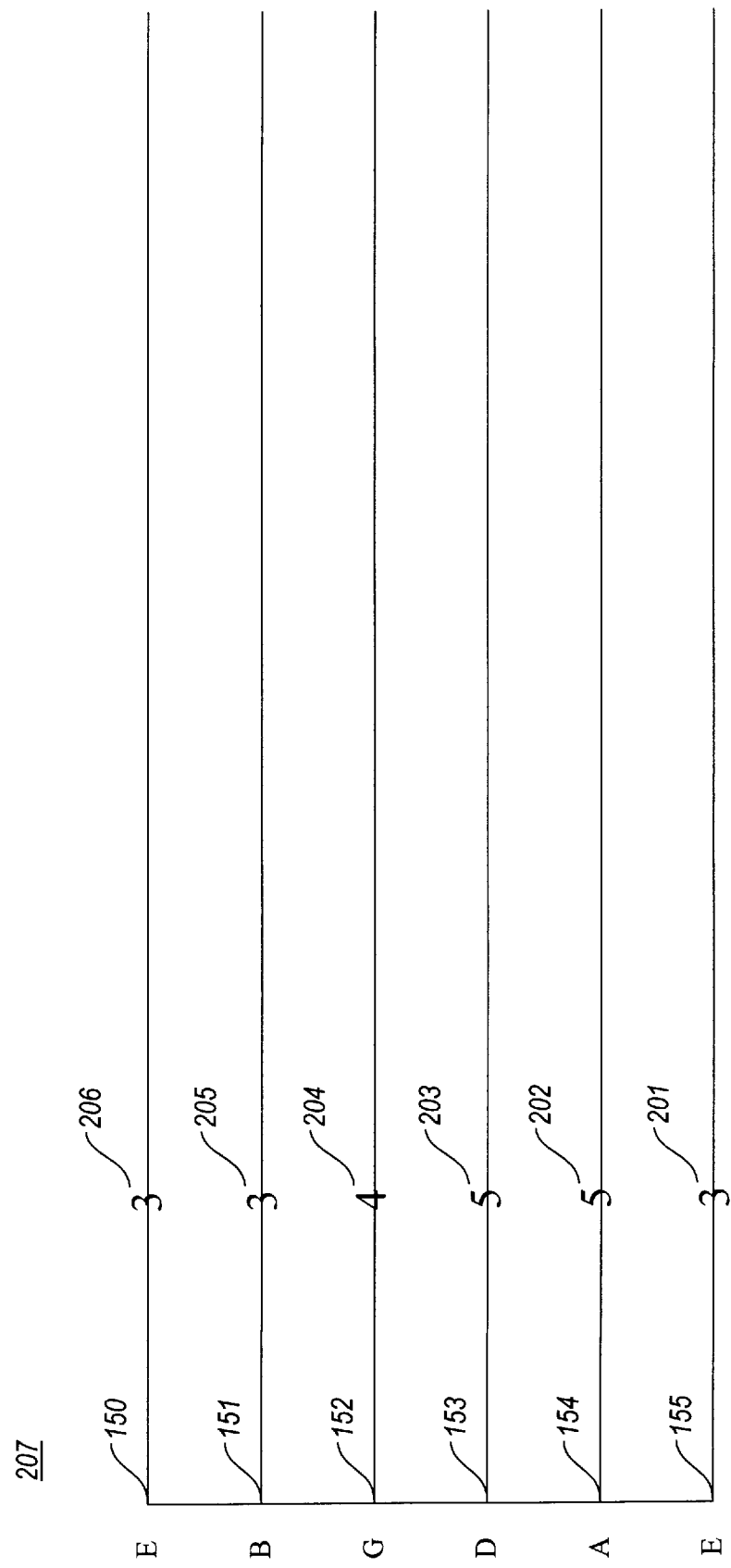
FIG. 2 illustrates a tablature notation that instructs a musician regarding how to play the notes in a musical score.
Figure 3:
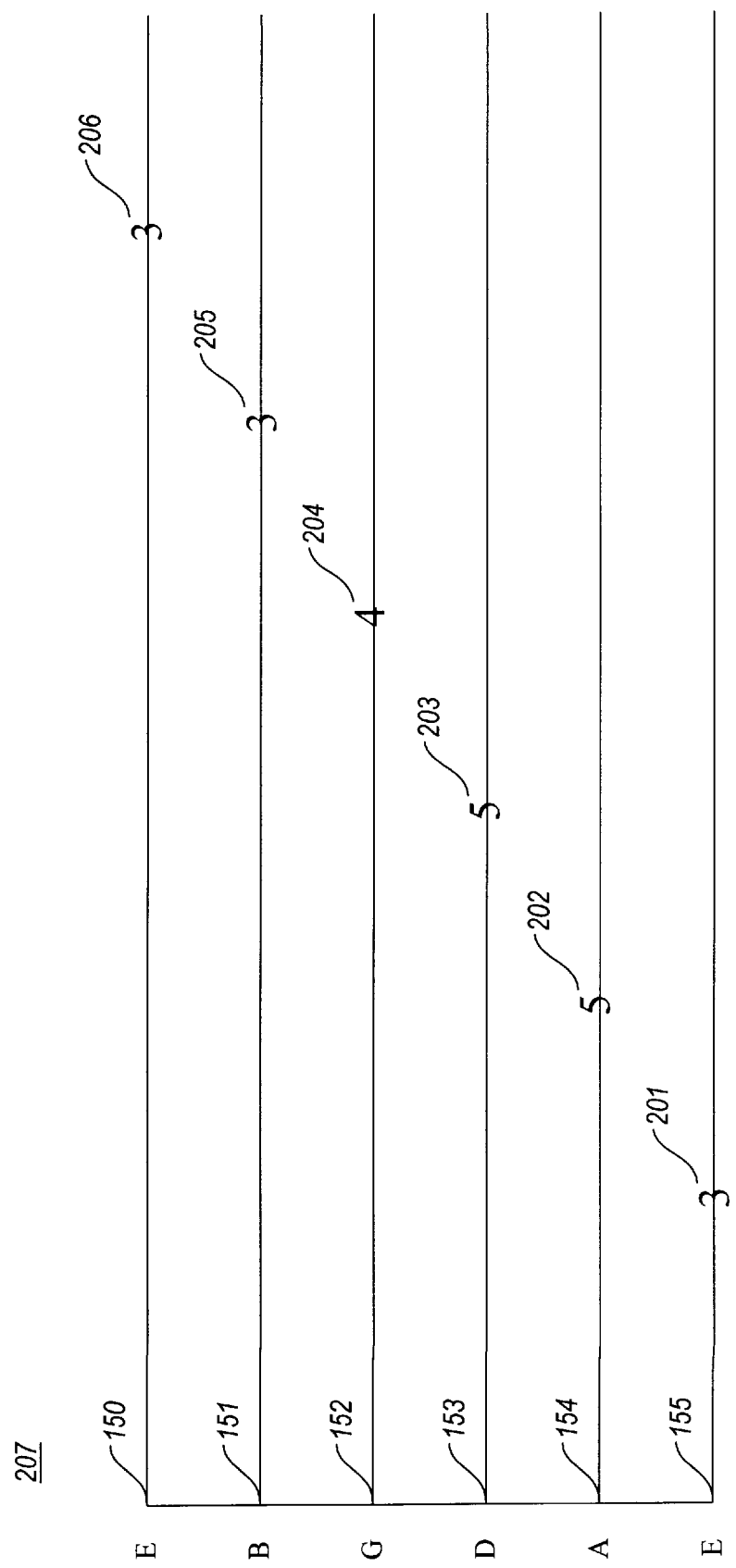
FIG. 3 illustrates a tablature notation for instructing a musician regarding the timing involved in strumming the strings of a stringed instrument.
Figure 4:
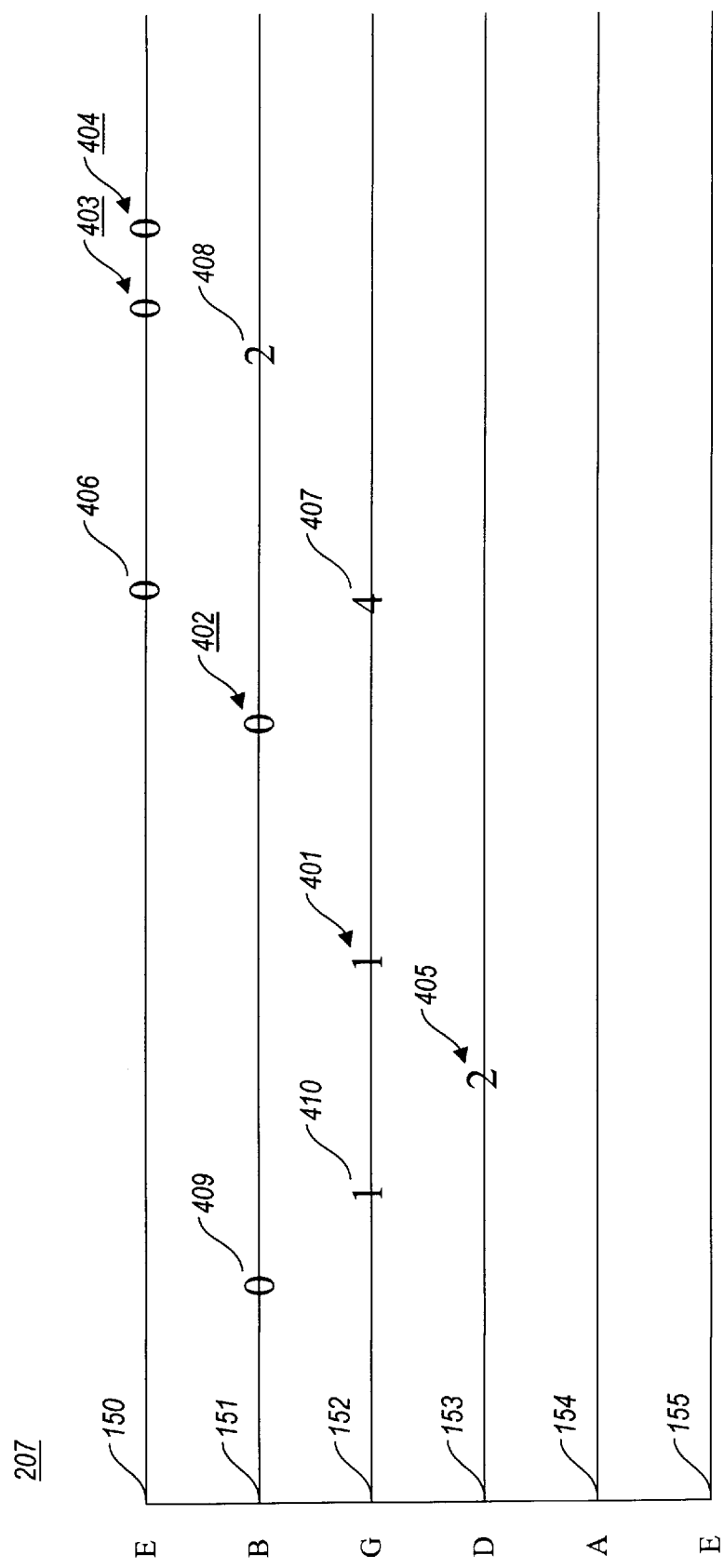
FIG. 4 illustrates how a tablature notation instructs a musician regarding the relative lengths of the notes in a musical score.

An embodiment of the invention provides a method and system for producing an enhanced tablature notation for a musical score corresponding to a musician's alterations to an instrument used to perform the musical score, changes in the musician's method for performing the musical score, and alterations to the musical score's conventional staff notation. The present invention automatically calculates the tuning of a string, the effective length of a string, and the musical note as these interrelated values are changed. If one value is assumed to be fixed (e.g., the tuning of a string) and another value is changed (e.g., the effective string length), then the other value (e.g., musical note) is automatically changed.

A computerized tablature composer provides a virtual tuning peg that automatically updates a musical score's tablature notation following a musician's re-tuning of one or more of the strings represented by the tablature notation. The computerized tablature composer tracks non-standard instrument tunings by allowing the fret numbers indicated in the tablature notation to change based upon the instrument tuning indicated by the musician, according to an embodiment of the invention.

The computerized tablature composer receives a musician's instructions for performing the musical score on a stringed instrument using non-standard fret locations. In accordance with such instructions, the computerized tablature composer provides the musician with an alternate tablature notation corresponding to the musician's alternate fret locations, according to an embodiment of the invention.

The computerized tablature composer automatically updates a tablature notation for a musical score following editing of a corresponding conventional staff notation for the same musical score. Conversely, the computerized tablature computer updates the conventional staff notation following edits of the tablature notation. The computerized tablature composer further allows the coupling between the tablature notation and the conventional staff notation to be de-coupled upon request. The computerized tablature composer also can automatically update both the conventional staff notation and the tablature notation when a transposition (e.g., change in pitch) of the musical score is desired.

The computerized tablature composer also ensures vertical alignment between a note in the conventional staff notation for a musical score and its corresponding note in the tablature notation for the musical score. Thus, the computerized tablature composer ensures alignment between the actual played notes in both musical notations as an aid to the musician performing the musical work.

Computers have been used to assist musicians in producing sheet music for musical compositions. For example, musicians may use an electronic pen and tablet in much the same way they would use a pen and paper tablet to create sheet music. The computerized tablature composer of the invention not only links a tablature notation to a corresponding conventional staff notation, but the computerized tablature composer further provides great flexibility in the tablature notation itself, allowing the musician to easily select alternate fret locations for the tablature notation.

Figure 5:
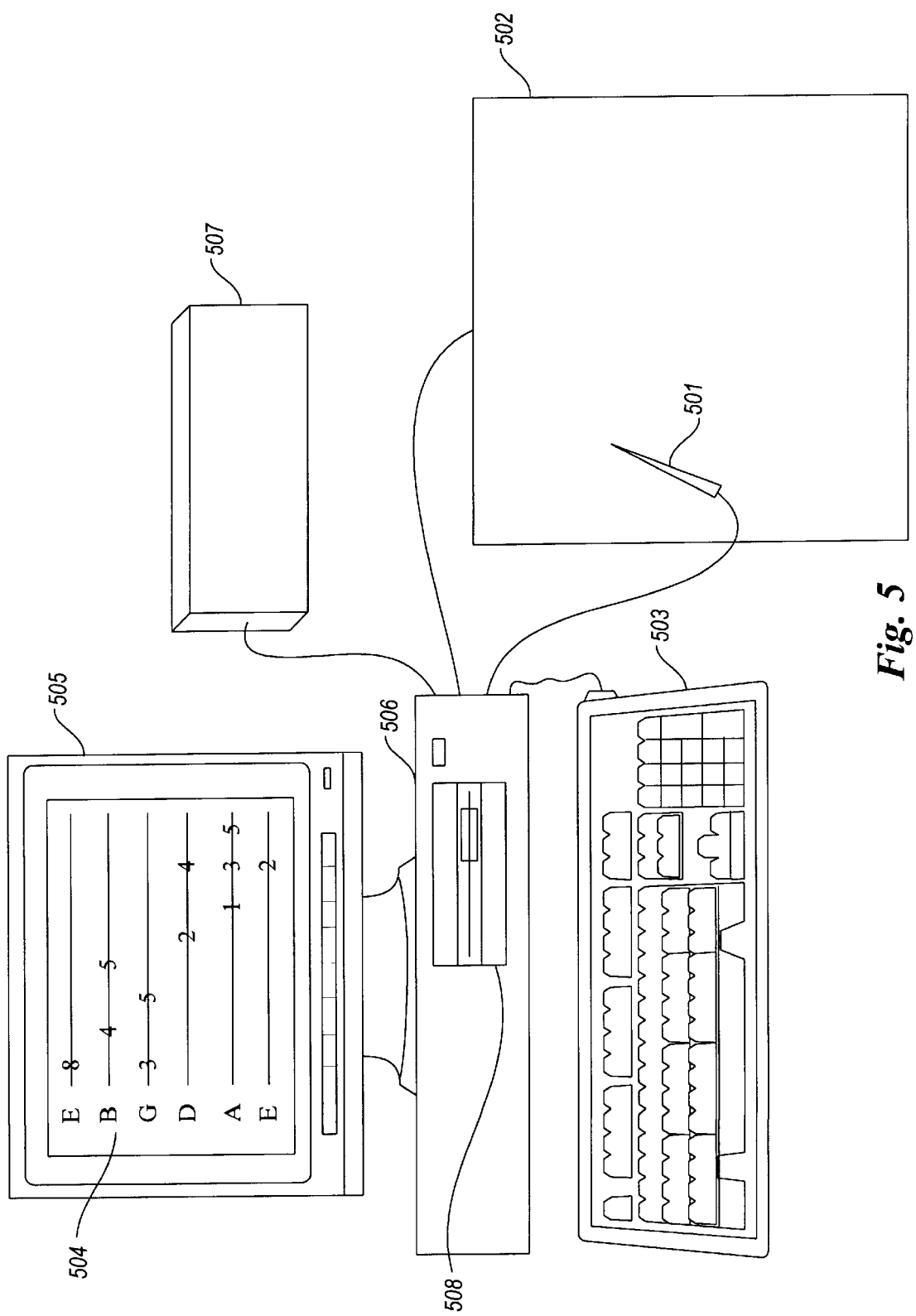
FIG. 5 illustrates an exemplary computing system for use in conjunction with an embodiment of the computerized tablature composer.

FIG. 5 illustrates an exemplary computing system for use in conjunction with the computerized tablature composer of the present invention. An exemplary computing system comprises a personal computer 506 having a keyboard 503, a monitor 505, a display 504, a pen input device 501, a tablet 502, and a computerized tablature composer 508. The computer 506 may also include a persistent storage device 507 that stores the tablature notations provided by the musician.

The pen input device 501 and the tablet 502 transmit input gestures made by a musician to the computer 506. The display 504 displays the pen's trace on the tablet 502, providing the musician with visual feedback of his input gestures.

The display 504 displays the input data as a tablature notation. As illustrated on the display 504 shown in FIG. 5, a musician has already utilized the pen input device 501 and the tablet 502 to provide a series of input gestures which the computerized tablature composer 508 has interpreted as a series of musical notations in tablature. The computer 506 may also include a means for uploading and downloading musical scores in tablature across a network. For example, the music shown on the display 504 may also have been provided from a repository of digital music retrieved by the musician over a network. The musician may edit retrieved musical scores by making appropriate inputs with the pen input device 501. The computerized tablature composer 508 does not force the musician to enter musical notations in a precise order. A single input gesture with the pen 501 typically creates a single tablature notation, according to an embodiment of the invention.

The musician may also set the display 504 to show both a tablature notation and a conventional staff notation when both musical notations are available for the same musical score. In this embodiment, the musician may edit either musical notation, with the computerized tablature composer 508 ensuring that changes to one musical notation are automatically reflected in both musical notations, according to an embodiment of the invention. The computerized tablature computer 508 may provide also useful feedback to the musician by visually indicating the tablature notation in view. For example, the computerized tablature composer 508 may show a tiny red circle around the tablature notation in view. This procedure also aids debugging, i.e., each time the musician provides an input gesture, the musician's display 504 shows a tablature notation surrounded by a group of little red circles. Musicians may find this feedback comforting while using the computerized tablature composer.

One example of a suitable musical input system is disclosed in U.S. patent application Ser. No. 09/209,585, "Method and System for Recognizing Musical Notations Using a Compass-Direction User Interface," filed on Dec. 11, 1998, and which is incorporated herein by reference.

Figure 6A:
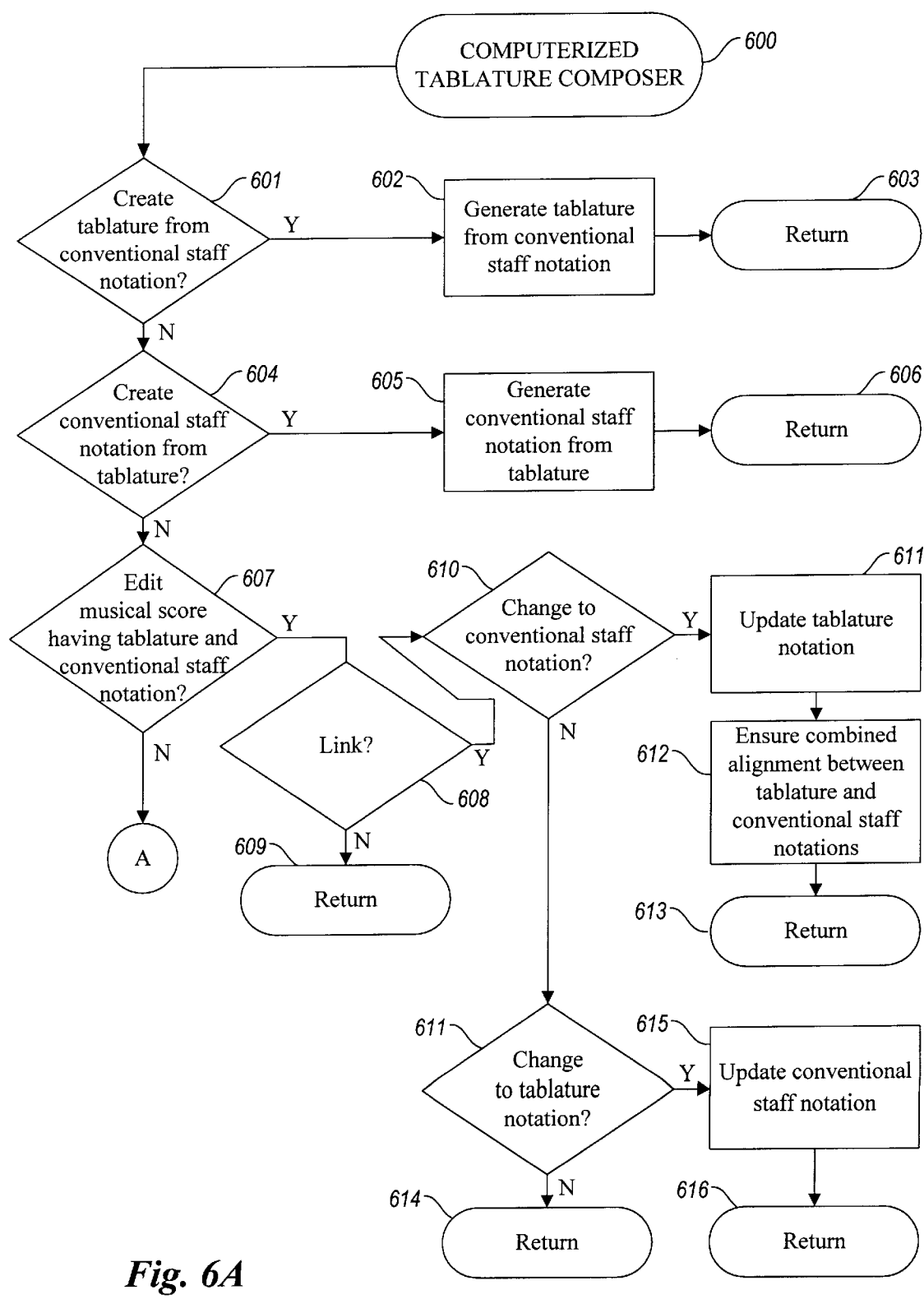
FIG. 6 is a flowchart illustrating the steps performed by the computerized tablature composer, according to an exemplary embodiment of the invention.
Figure 6B:
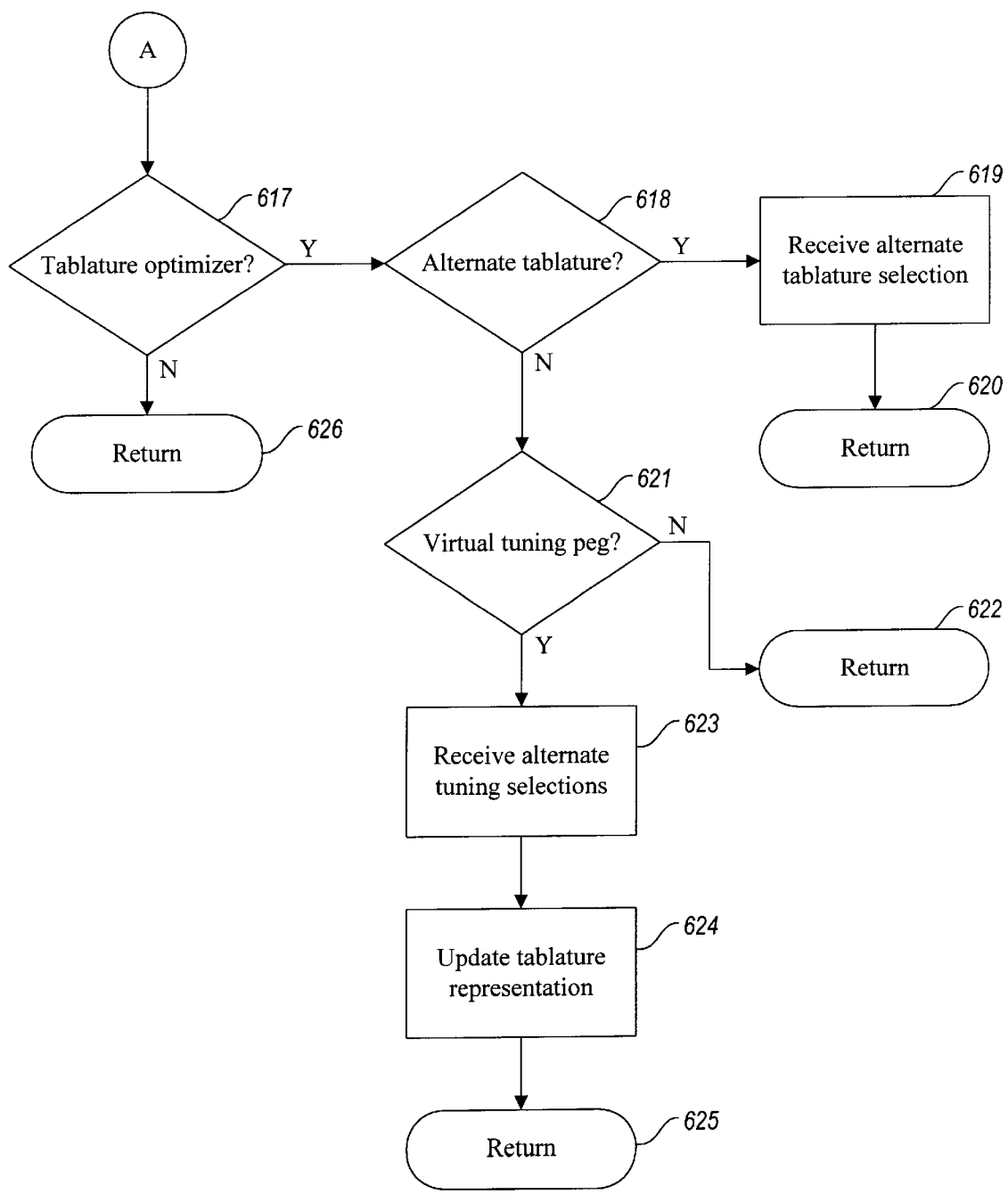

FIG. 6 is a flowchart illustrating the steps performed by the computerized tablature composer, according to an exemplary embodiment of the invention. The computerized tablature composer provides four primary functions, creating a tablature notation from a conventional staff notation, creating a staff notation from a tablature notation, editing both conventional staff notation and the corresponding tablature notation for a given musical work, and optimizing the tablature notation for a musical work according to criteria received from a musician.

The computerized tablature composer determines if a musician wishes to create a tablature notation for a musical score (step 601). Accordingly, the computerized tablature composer may examine the conventional staff notation for a musical score and produce a tablature notation for the musical score according to a standard tablature format (step 602). As previously discussed, tablature notation exists in a variety of formats. Accordingly, the computerized tablature composer allows the musician to select a tablature format from among a number of tablature formats available to the computerized tablature composer. The musician can also dd additional tablature formats to the computerized tablature composer's list of tablature formats.

The computerized tablature composer also determines if a musician desires to create a conventional staff notation from an existing tablature notation (step 604). If the musician has indicated that a conventional staff notation should be produced from a tablature notation, then the computerized tablature composer creates the corresponding conventional staff notation for the musical score (step 605). As previously discussed, the conventional staff notation typically represents more information about a musical work than a tablature notation. Accordingly, the computerized tablature composer may utilize an intelligent tablature wizard in generating the conventional staff notation from a tablature notation. In addition, the musician may also edit the generated conventional staff notation to provide additional musical information. In generating the conventional staff notation, the computerized tablature composer allows the musician to indicate from which of the conventional tablature formats the selected tablature has been prepared, which reduces errors during the conversion process.

The computerized tablature composer also provides the ability to edit musical scores and corresponding tablature notations. When the editing mode (step 607) has been selected, the computerized tablature composer then determines whether linking between the conventional staff notation and the tablature notation has been enabled (step 608). If the musician has enabled linking, then the computerized tablature composer determines if the musician has entered changes to the conventional staff notation (step 610) or to the tablature notation (step 611). The elements (e.g., quarter note) of conventional staff notation can be linked to the corresponding elements of tablature notation using double links. That is, the data structure representing an element in one notation contains a pointer to the data structure for the corresponding element in the other notation, and vice versa.

If the musician has edited the conventional staff notation (step 610), then the computerized tablature composer provides updates to the tablature notation resulting from the editing of the staff notation (step 611), e.g., updating the fret number for a note in the tablature notation to correspond to a changed note in the conventional staff notation. The computerized tablature composer also ensures continued alignment between the corresponding musical notes of the conventional staff notation and the tablature notation (step 612).

If the musician changes the tablature notation (step 611), the computerized tablature composer provides any updates necessary in the corresponding conventional staff notation (step 615). For example, if the musician changes a note represented in tablature, then the computerized tablature composer will automatically update the corresponding note in the conventional staff notation.

The computerized tablature composer also provides a tablature optimizer (step 617). The tablature optimizer allows the musician to select alternate fret locations for a note in the tablature notation and further provides the musician with a new tablature notation based upon a re-tuning of the instrument's strings using a virtual tuning peg. When the musician requests a new fret location for an existing tablature note (step 618), the computerized tablature composer provides alternate fret locations for the selected tablature note and then receives the alternate fret location selection from the musician (step 619). For example, the musician selects a note in the tablature and then selects an alternate string. The computerized tablature composer recognizes that the musician wants to play the selected note on the selected string and provides the corresponding fret number for the note on the selected string.

When the musician selects the virtual tuning peg feature (step 621), the computerized tablature composer provides the musician with alternate tuning choices for the string(s) selected by the musician and then receives the musician's new tuning selections (step 623). The computerized tablature composer then updates the tablature notations for the selected string(s) based upon the new tunings and the underlying musical score (step 624). In updating the tablature notations, the computerized tablature composer may also determine whether the musician wishes to readjust the tablature notation for other strings of the instrument based upon the re-tuning of the instrument's string(s). If the musician has indicated that a new tablature selection should be performed for multiple strings, then the computerized tablature composer may invoke an intelligent fret location wizard that selects a new tablature notation for the entire musical score based upon the re-tuned string(s) and an understanding of the expected fret selections utilizing the re-tuned string(s). Of course, the musician does not have to engage the intelligent fret wizard and may disregard or edit its tablature notation selections.

Figure 7A:
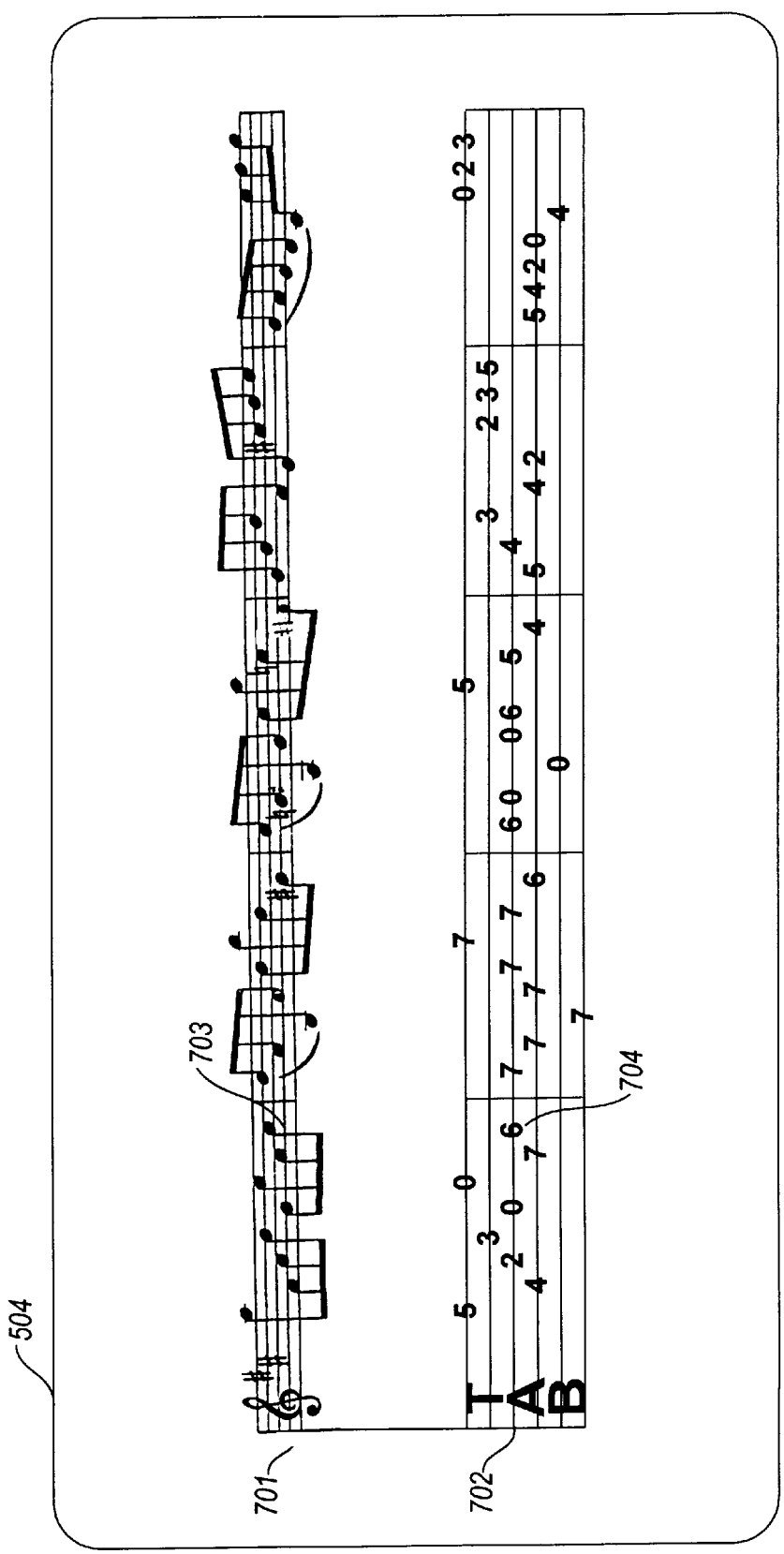
FIGS. 7A–7D illustrate an exemplary embodiment of the computerized tablature composer that maintains an accurate correspondence between a tablature notation and a conventional staff notation.
Figure 7B:
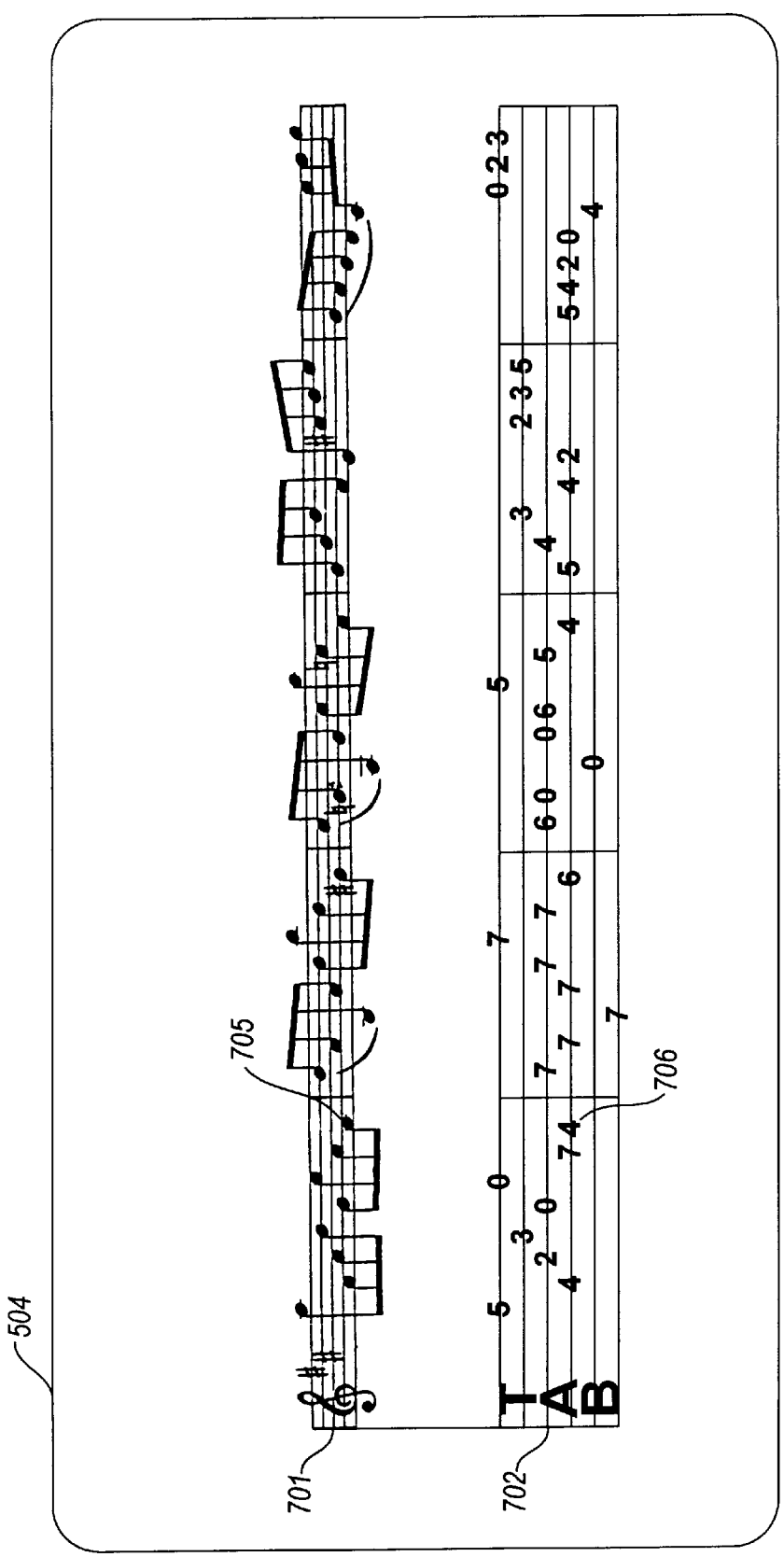

FIGS. 7A–7D illustrate an exemplary embodiment of the computerized tablature composer that maintains an accurate correspondence between notes in a tablature notation and notes in conventional staff notation. FIG. 7A illustrates a portion of "Partita No. 1 in B minor," by Johann Sebastian Bach, shown on the display in both conventional staff notation 701 and in a corresponding tablature notation 702. As shown in FIG. 7A, a last note 703 in the first measure of the staff notation 701 corresponds to a tablature notation 704 that indicates fingering of the sixth fret of the G string. Using a music editor, the musician deletes the note 703 and replaces it with a note 705, as shown in FIG. 7B. The computerized tablature composer automatically deletes the note 704 and replaces it with a note 706 that instructs the musician to play the fourth fret of the D string. Once the computerized tablature composer understands the change made to a musical score in conventional staff notation 701, the computerized tablature composer automatically updates the corresponding tablature notation 702.

Figure 7C:
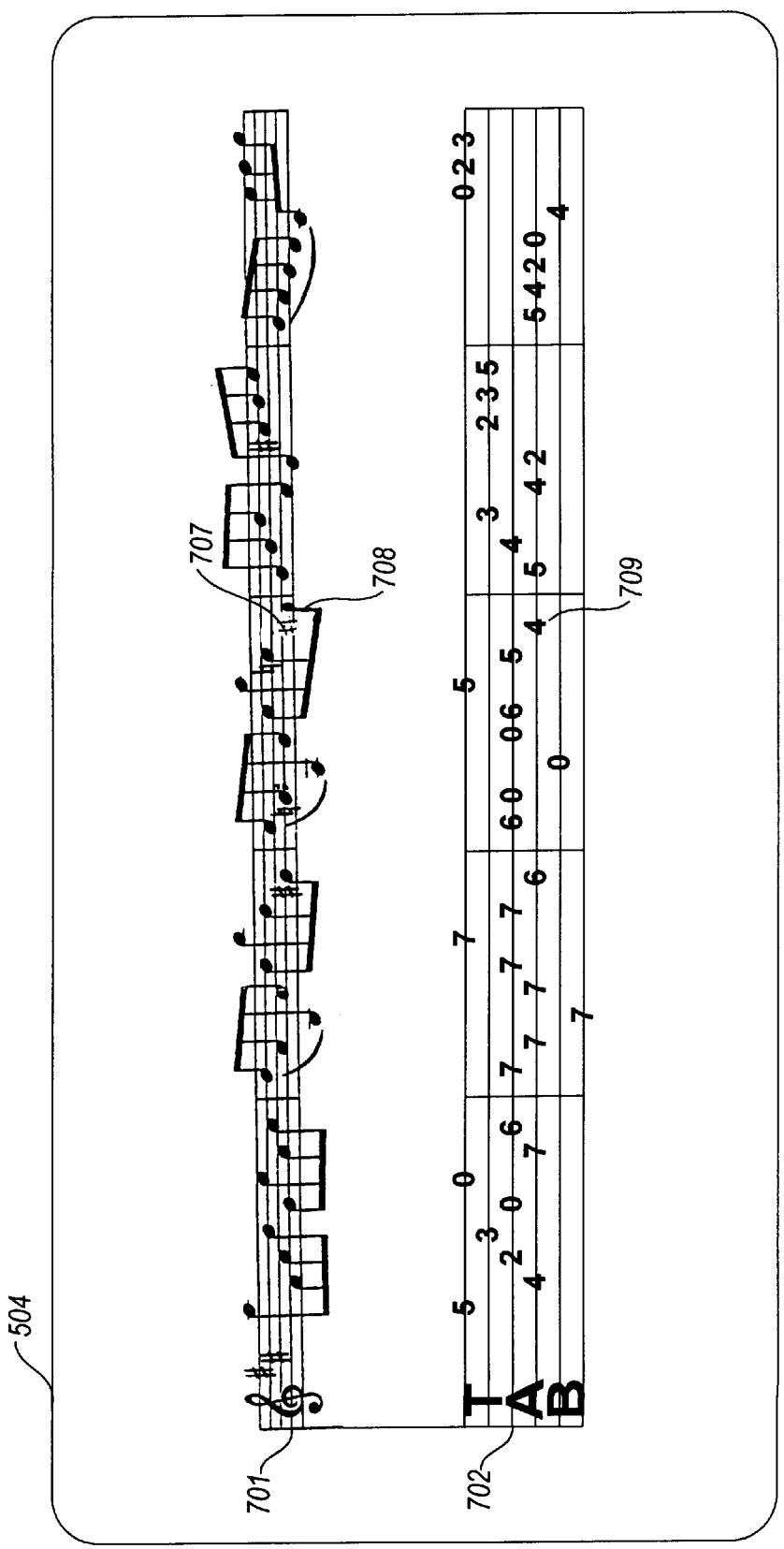

FIG. 7C shows the musician inserting a sharp notation 707 into the staff notation 701. Inserting the sharp notation 707 into conventional staff notation 701 causes a note 708 to move rightward. Of course, a sharp or flat notation placed in conventional staff notation 701 does not have a corresponding symbol the tablature notation 702, although such a change may raise or lower the fret number shown in the tablature. As previously discussed, the notes in conventional staff notation 701 should align with the notes in the tablature notation 702. Accordingly, once the computerized tablature composer recognizes that the musician has inserted the sharp notation 707 into conventional staff notation 701, causing the note 708 to be relocated, the computerized tablature composer automatically relocates a note 709 in the tablature notation 702 to correspond to the note 708 in conventional staff notation 701. Thus, the computerized tablature composer maintains alignment of the notes in conventional staff notation 701 and the corresponding tablature notation 702.

The computerized tablature composer strives to maintain alignment between corresponding notes of the two notational systems when a notation exists in conventional staff notation 701 for which no corresponding notation exists in the tablature notation 702. This alignment ensures that the musician may instantly recognize which note in the tablature notation 702 corresponds to which note in conventional staff notation 701 without having to undertake a cumbersome comparison between the two musical notation systems. Thus, any lateral movement of a note in conventional staff notation 701 invokes a lateral movement of a corresponding note in the tablature notation 702.

Figure 7D:
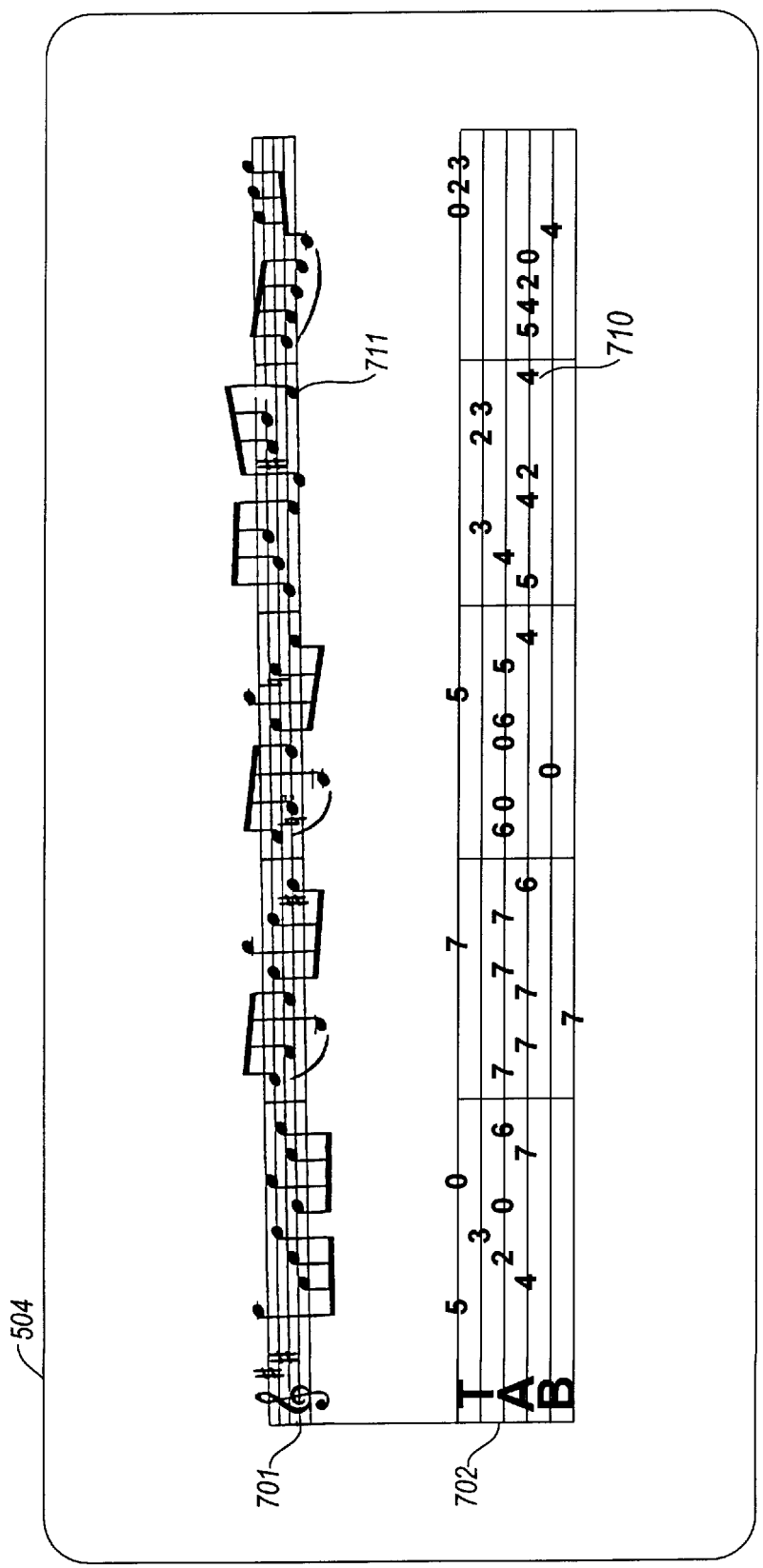

FIG. 7D illustrates another feature of the computerized tablature composer. When the musician alters the fret location, or fret number, or effective string length, in the tablature notation 702, the computerized tablature composer automatically updates a corresponding note in the conventional staff notation 701. Accordingly, when the musician alters a fret location 710 in the forth measure of the tablature notation 702 from the fifth fret on the B string to the fourth fret on the D string, the computerized tablature composer automatically relocates a note 711 in the conventional staff notation 701. Again, the computerized tablature composer ensures that both conventional staff notation 701 and the tablature notation 702 provide identical representations of the same musical score.

The musician may disengage the computerized tablature composer's automatic coupling between the staff notation and the tablature notation when advantageous. From time to time, a musician will encounter extremely non-standard musical notations in either the conventional staff notation or in the tablature notation that should not be reflected in both the musical representations. Thus, the musician may turn off the coupling feature in the computerized tablature composer for those circumstances when it is advantageous to do so.

FIGS. 8A–8D illustrate additional enhancements to tablature notation that may be provided by the computerized tablature composer, according to embodiments of the invention. Previously discussed embodiments of the computerized tablature composer have enhanced the linkage between a conventional staff notation and a tablature notation. In addition to providing an improved the linkage between a conventional staff notation and a tablature notation, the computerized tablature composer also provides the musician with enhanced flexibility in the use and presentation of tablature notation. The musician may find this enhanced flexibility improves his performance of the musical work represented by the tablature notation.

Musicians find alternate fret locations helpful in performing a musical work on a stringed instrument because the same note may be sounded in multiple places on many stringed instruments, e.g., the guitar. Musicians find some fret locations easier to play than others, especially in light of other nearby notes in the musical work. A guitar, for example, has a range of three octaves, and most of the notes in those octaves may be sounded from more than one fret location on this six-string instrument. On certain occasions, the musician may desire to play the same note but in a different fret location, such as a fret location on a different string. Accordingly, the computerized tablature composer allows the musician to indicate alternate fret locations for a musical work's tablature notation. Such alternate fret locations is an example of "ease-of-playing data." The computerized tablature composer further permits the musician to switch between different possible fret locations with ease in order to aid the musician in identifying the most satisfactory set of fret locations for a given musical work. Of course, the computerized tablature composer also provides the musician with a printout of the musical score's tablature notation. In addition, the musician may re-edit the tablature notation to indicate additional fret locations. Thus, the musician may indicate multiple fret locations for the same notes in a musical work and then switch the display of the tablature notation back and forth from one set of fret locations to another set of fret locations.

Figure 8A:
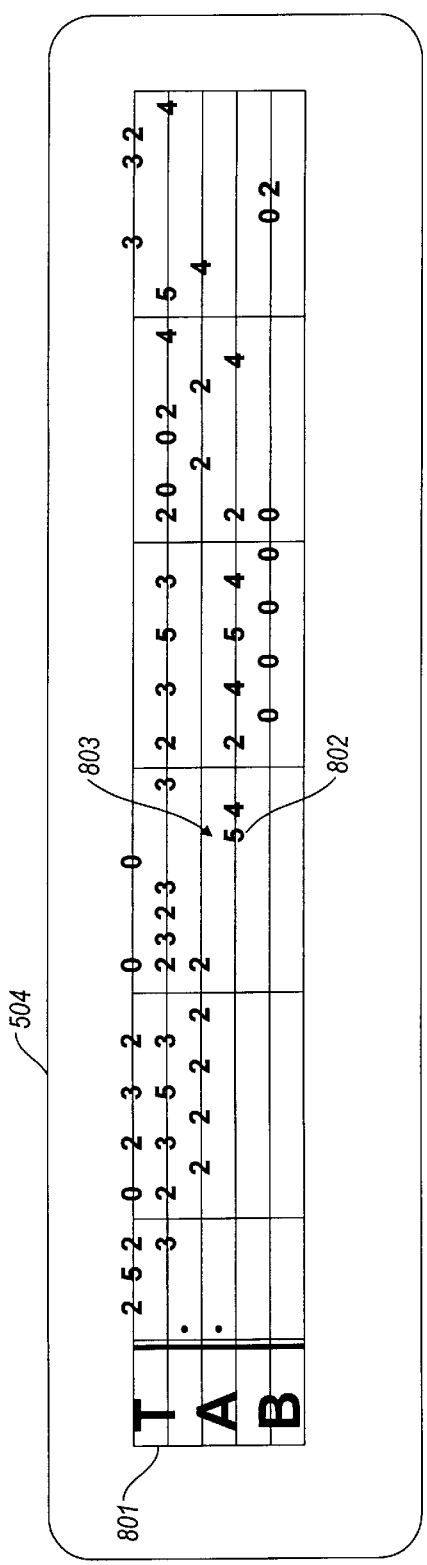
FIGS. 8A–8D illustrate additional tablature features that may be enabled by the computerized tablature composer, according to embodiments of the invention.

FIG. 8A illustrates a tablature notation for another selection from the "Partita No. 1 in B minor," by Bach, shown previously in FIGS. 7A–7D. A corresponding staff notation has not been illustrated in FIG. 8A since this aspect of the invention does not effect the staff notation for a musical work.

Figure 8B:
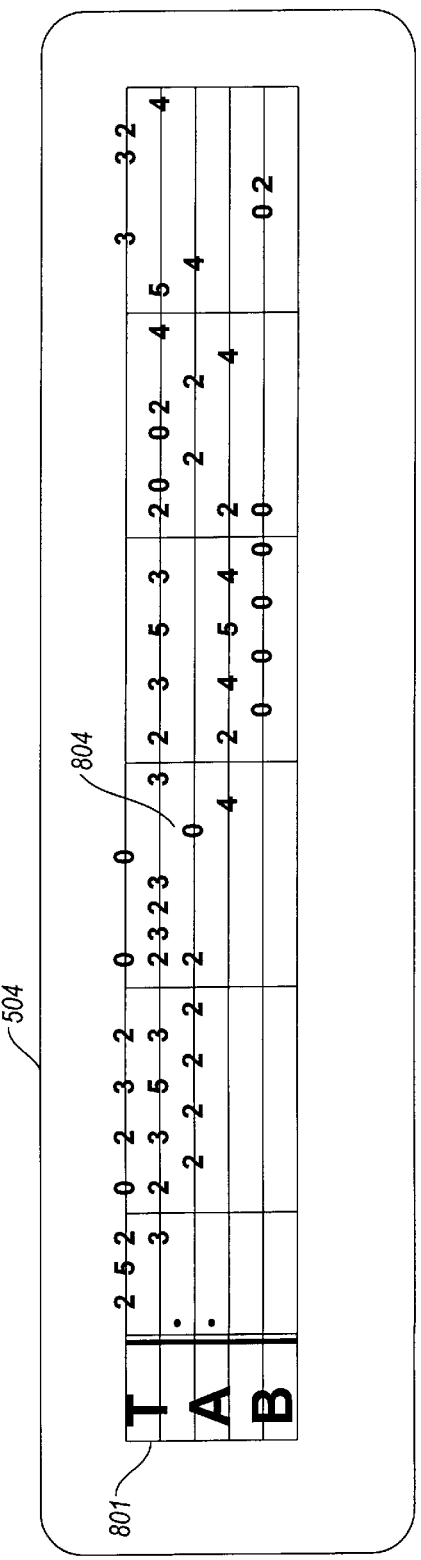

The musician decides that a note 802 shown in the third measure should have an alternate fret location on another string. As presently indicated, the musician plays the note 802 as the fifth fret on the D string. Accordingly, the musician selects the note 802 using an input device, such as the pen input device 501 shown in FIG. 5. The musician wishes to move the fret location for the note 802 to the G string and, therefore, selects an alternate string 803. The computerized tablature composer recognizes that the musician has requested that the fret location for the note 802 be relocated to the string 803. Accordingly, the computerized tablature composer translates the note 802 into a note 804 on the G string, as shown in FIG. 8B. The note 804 corresponds to the open G string and requires that no fret be fingered.

The computerized tablature composer allows the musician to select and store multiple fret locations for the same note in a musical work. The musician may select a preferred set of fret locations for a given musical work. For example, an inexperienced guitarist may find a particular set of fret locations easier to play than another set of fret locations, while an experienced musician may find that a more complicated set of fret locations produces richer tones from the instrument when he performs the musical work.

In addition to the tablature note creation feature shown above, the computerized tablature composer also provides fret locations for non-standard tunings of a stringed instrument, such as a guitar. Some musicians prefer to tune their stringed instruments to non-standard tunings, which may simplify the making of particular sounds in comparison to those using a standard tuning. For example, a musician may tune two strings on a guitar to virtually the same sound or even to precisely the same sound, such that the musician may easily strike two sounds simultaneously even though they are very close to each other. A musician may also utilize a "capo," a small movable bar placed across the fingerboard of a stringed instrument, such as a guitar, to raise the pitch of all the strings uniformly. The use of a capo is equivalent to re-tuning each string.

Figure 8C:
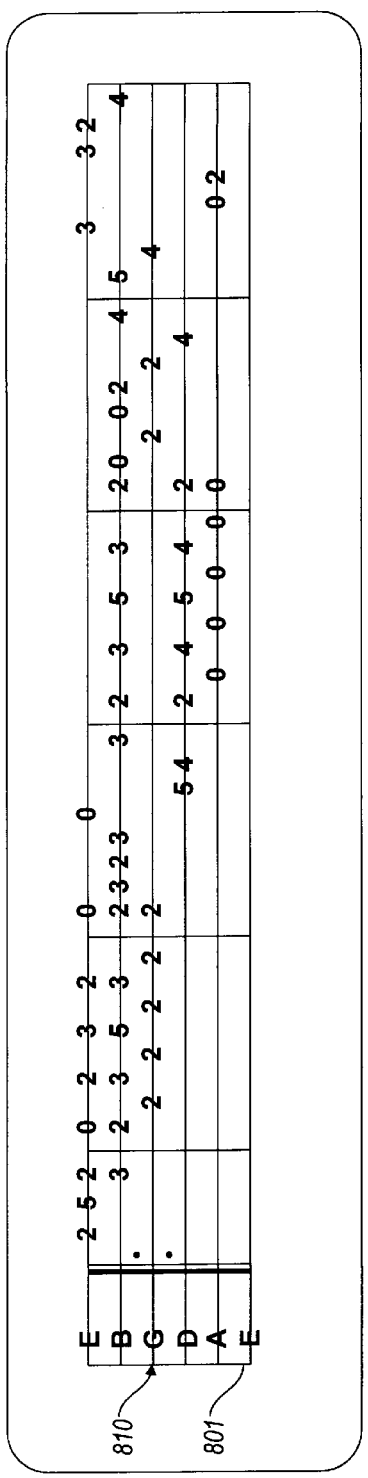
Figure 8D:
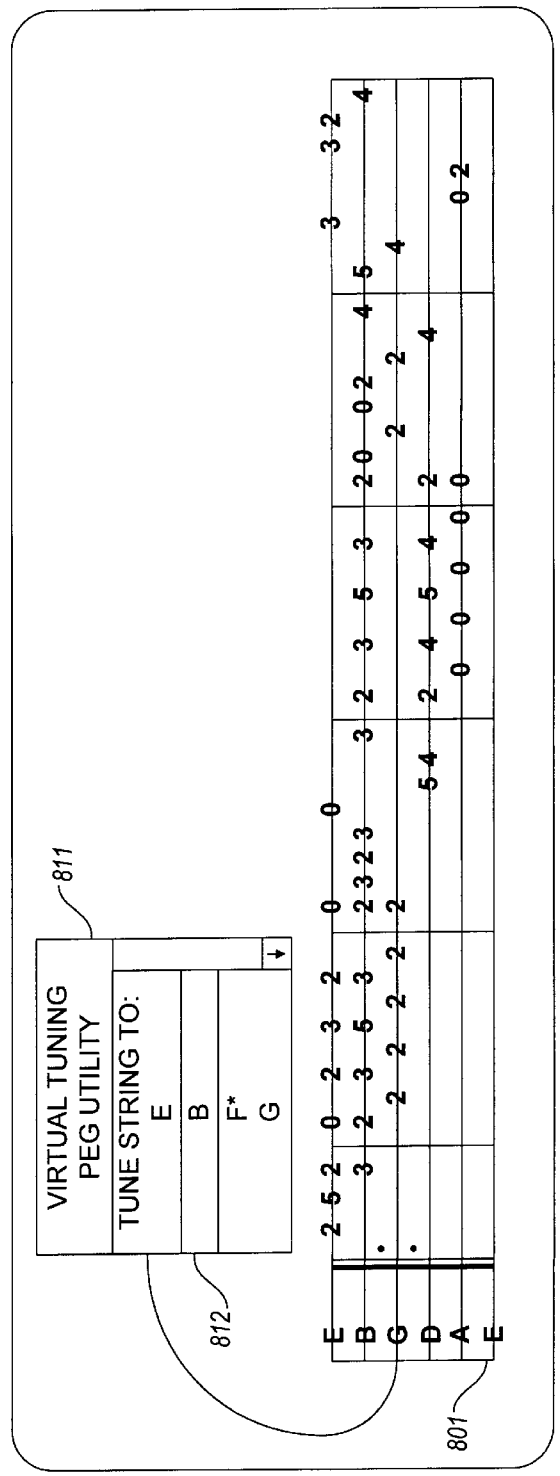

The computerized tablature composer enables tracking of these non-standard tunings, and the use a capo, by allowing the fret locations to change based upon the indicated tuning. For example, as shown in FIG. 8C, a musician may indicate an alternate tuning for one of the six strings of the guitar, such as a G string 810. Selection of the G string 810 invokes the computerized tablature composer's virtual tuning peg utility 811, as shown in FIG. 8D.

The virtual tuning peg utility 811 allows the musician to tune one or more selected strings to any pitch attainable by a guitar string. Thus, the virtual tuning peg utility 811 provides few limitations on the possible tunings for the G string 810. As shown in FIG. 8D, the musician has selected to tune the string to a B pitch 812. If the musician selects the B pitch tuning 812 in the virtual tuning peg utility 811, then the computerized tablature composer will automatically update all of the tablature notations for that string in the musical work.

Figure 9A:
FIGS. 9A–9F illustrate one embodiment of a user interface for tuning.
Figure 9B:
Figure 9C:
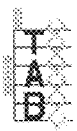
Figure 9D:
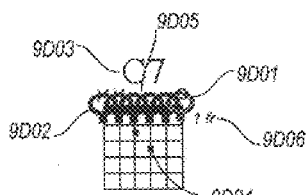
Figure 9E:
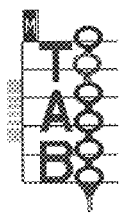
Figure 9F:
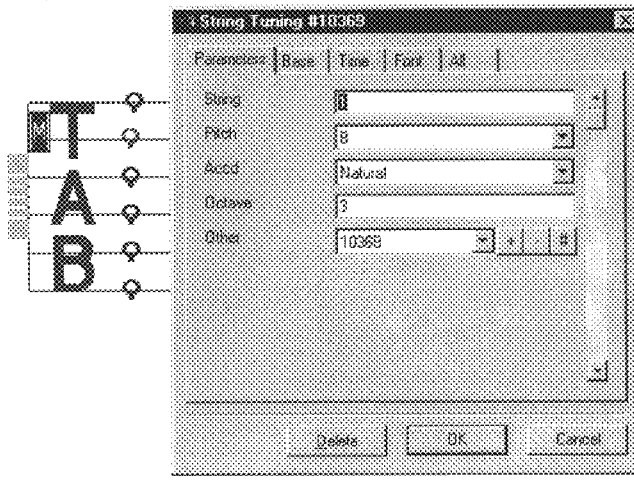

FIGS. 9A–9F illustrate one embodiment of a user interface for tuning. FIG. 9A illustrates a "tuning" icon. One tuning icon is displayed for each string when a guitar chord figure or a tablature staff is displayed. In one embodiment, the tuning icon is displayed in a de-emphasized manner (e.g., grey). FIG. 9B illustrates the tuning icons of a guitar chord figure, and FIG. 9C illustrates the tuning icons of a tablature staff. The re-tuning of a string can be indicated by selecting a tuning icon. FIG. 9D illustrates the selection of a tuning icon for a guitar chord figure. When selected, the tuning icon is highlighted in red 9D01 and the grid of the chord figure is highlighted in dark blue 9D02. The chord's figure name 9D03, the dots and number that represent the chord's fingering 9D04, the other tuning icons 9D05, and the text that identifies the fret on which the chord is based 9D06 are highlighted in purple. FIG. 9E illustrates the selection of a tuning icon for a tablature staff. When selected, the tuning icon is highlighted in red 9E01. FIG. 9F illustrates a dialog box for indicating the tuning of the selected string. The changed tuning is indicated by changing the value in the "Pitch" edit box.

In addition, the computerized tablature composer may also contain an intelligent musician utility that provides the musician with alternate tablature notations for other strings on the instrument in light of the selected alternate tuning for a particular string. Of course, the musician need not invoke this utility and may decline to accept its suggestions. Accordingly, the computerized tablature composer enables non-standard tunings by allowing the fret numbers expressed in the tablature notation for a musical work to change based upon a selected tuning.

While the present invention has been described with reference to a preferred embodiment thereof, those skilled in the art will appreciate that various changes in form and detail may be made without departing from the intended scope of the present invention as defined in the appended claims. For example, the music inputting and manipulation devices may differ from those shown in the figures. The pen input device may have different connections with the computing environment than those shown above, and another type of input device may be used instead of or in combination with the pen input device. Moreover, the exemplary computerized tablature composer provided in the invention may actually be comprised of microcode provided in various pieces of hardware equipment, provided that the collected operation of the components operate in the manner that has been described.

Although specific embodiments of, and examples for, the invention are described herein for illustrative purposes, various equivalent modifications are possible within the scope of the invention, as will be recognized by those skilled in the relevant art. Various exemplary computing systems, and accordingly various other system configurations may be employed under the invention. The embodiments of the invention disclosed herein have been discussed with regard to a personal computing environment. However, the invention finds equal applicability in other computing systems, such as large centralized computing systems and portable computerized systems, and even hand-held computing devices.

These and other changes can be made to the invention in light of the above detailed description. In general, in the following claims, the terms used should not be construed to limit the invention to the specific embodiments disclosed in the specification and the claims, but should be construed to include all user interfaces that operate under the claims. Accordingly, the invention is not limited by the disclosure, but instead its scope is to be determined by the following claims.

What is claimed is:

1. A method in a computer system for editing a musical score expressed in both a first notation and a second notation, comprising:
   receiving an indication of a change in the first notation expression of the musical score;
   changing the first notation expression of the musical score in accordance with the received indication; and
   automatically changing the second notation expression of the musical score to correspond to the change in the first notation expression of the musical score.

2. The method of claim 1 wherein the first notation is conventional staff notation and the second notation is a tablature notation.

3. The method of claim 1 wherein the first notation is a tablature notation and the second notation is conventional staff notation.

4. The method of claim 1, further comprising:
   presenting the first notation on a display medium; and
   presenting the second notation on the display medium at a location having an orientation of one of above or below the first notation.

5. The method of claim 4 wherein the first notation has musical notes corresponding to musical notes in the second notation, further comprising:
   aligning vertically on the display medium at least some of the musical notes of the first notation with corresponding musical notes in the second notation.

6. The method of claim 1 wherein the display medium is an electronic tablet.

7. The method of claim 4 wherein the display medium is a display screen.

8. The method of claim 1, further comprising:
   receiving a request to disengage changing automatically the second notation to correspond to the change in the first notation.

9. The method of claim 1 wherein the change in the first notation is a change from a first musical note to a second musical note.

10. The method of claim 1 wherein the change in the first notation is a change from a first musical symbol to a second musical symbol.

11. A method in a computer system for adjusting a musical score expressed in a tablature notation, comprising:
    receiving a selection of a current effective length of a string that represents a note of the tablature notation;
    receiving a selection of another string of the tablature notation; and
    in response to receiving the selection of the current effective length of the string and the selection of the other string,
       identifying an effective length of the other string that represents the same note of the tablature notation as the note represented by the current effective length of the string; and
       generating a tablature notation wherein the note of the tablature notation is represented by the identified effective length of the other string.

12. The method of claim 11, further comprising:
    displaying the selection of the current effective length of a string on a display medium; and
    displaying the selection of the other string on a display medium.

13. The method of claim 12 wherein the display medium is a display screen.

14. The method of claim 11, further comprising:
    displaying the identified effective length of a string on a display medium.

15. The method of claim 11 wherein the musical score has a conventional staff notation containing a plurality of musical notes, the method further comprising:
    receiving an indication of a change in the staff notation;
    automatically changing the tablature notation to correspond to the change in the conventional staff notation.

16. The method of claim 15, further comprising:
presenting the conventional staff notation on a display medium; and
presenting the tablature notation on the display medium at a location having an orientation of one of above or below the conventional staff notation.

17. The method of claim 16 wherein the tablature notation has musical notes corresponding to musical notes in the conventional staff notation, further comprising:
aligning vertically on the display medium at least some of the musical notes of the tablature notation with corresponding musical notes in the conventional staff notation.

18. The method of claim 16 wherein the display medium is an electronic tablet.

19. The method of claim 16 wherein the display medium is a display screen.

20. A method in a computer system for generating a musical score expressed in tablature notation, comprising:
providing a current tuning note representing a current tuning for a line of a tablature notation;
receiving a new tuning note representing a new tuning for the line of the tablature notation; and
generating a tablature notation for the musical score to reflect the new tuning of the line.

21. The method of claim 20, further comprising:
receiving a new tuning indication for the line; and
displaying a list of possible tunings for the line on a display medium after receiving the new tuning indication.

22. The method of claim 20, further comprising:
displaying the new tuning for the line on a display medium.

23. The method of claim 20, further comprising:
displaying the new tablature notation on a display medium.

24. The method of claim 23 wherein the display medium is a display screen.

25. The method of claim 20 wherein the tablature notation comprises a set of lines, further comprising:
receiving a new tuning for each line in the set of lines of the tablature notation; and
generating the tablature notation to reflect the new tuning for the set of lines.

26. The method of claim 25, further comprising:
receiving a new tuning indication for the set of lines; and
displaying a list of possible tunings for the set of lines on a display medium after receiving the new tuning indication.

27. The method of claim 20 wherein each line in the set of lines corresponds to a string of a stringed instrument, further comprising:
receiving ease-of-playing data for the stringed instrument, wherein the generation of the tablature notation to reflect the new tuning for the set of lines utilizes the received ease-of-playing data.

28. The method of claim 20 wherein the musical score has a conventional staff notation containing a plurality of musical notes, the method further comprising:
receiving an indication of a change in the staff notation;
automatically changing the tablature notation to correspond to the change in the conventional staff notation.

29. In a computing system, a computer-readable medium having a data structure for a musical work containing musical notes, comprising:

a tablature notation data field containing musical note representations for the musical notes of the musical work in tablature notation, wherein the tablature notation data field provides a first set of effective lengths of strings for the musical notes of the musical work; and
a tablature translation key field that provides a translation of the first set of effective lengths of strings into at least a second set of effective lengths of strings for the musical notes of the musical work.

30. The data structure of claim 29, further comprising:
a conventional staff notation data field containing musical note representations for the musical work in conventional staff notation; and
an alignment field containing data for aligning the musical note representations of the tablature notation data field with the musical note representations of the conventional staff notation data field.

31. A computer-readable medium containing instructions for causing a computer system to edit a musical score expressed in both a first notation and a second notation, by:
receiving an indication of a change in the first notation expression of the musical score;
changing the first notation expression of the musical score in accordance with the received indication; and
automatically changing the second notation expression of the musical score to correspond to the change in the first notation expression of the musical score.

32. The computer-readable medium of claim 31 wherein the first notation is conventional staff notation and the second notation is a tablature notation.

33. The computer-readable medium of claim 31 wherein the first notation is a tablature notation and the second notation is conventional staff notation.

34. The computer-readable medium of claim 31, further including:
presenting the first notation on a display medium; and
presenting the second notation on the display medium at a location having an orientation of one of above or below the first notation.

35. The computer-readable medium of claim 34 wherein the first notation has musical notes corresponding to musical notes in the second notation, further comprising:
aligning vertically on the display medium at least some of the musical notes of the first notation with corresponding musical notes in the second notation.

36. The computer-readable medium of claim 31 wherein the display medium is an electronic tablet.

37. The computer-readable medium of claim 31 wherein the display medium is a display screen.

38. The computer-readable medium of claim 31, further including:
receiving a request to disengage changing automatically the second notation to correspond to the change in the first notation.

39. The computer-readable medium of claim 31 wherein the change in the first notation is a change from a first musical note to a second musical note.

40. The computer-readable medium of claim 31 wherein the change in the first notation is a change from a first musical symbol to a second musical symbol.

41. The computer-readable medium of claim 31 wherein the received indication of a change is an indication to transpose the musical score to a different pitch.

42. The computer-readable medium of claim 31 wherein when the received indication is to change a musical note in conventional staff notation, the automatically changing indicates a new effective length of a string in a tabulative notation.

43. The computer-readable medium of claim 31 wherein when the received indication is to change a musical note in conventional staff notation, the automatically changing indicates to retune a string.

44. The computer-readable medium of claim 31 wherein when the received indication is to retune a string represented by tabulative notation, the automatically changing indicates a new location of a musical note in conventional staff notation.

45. The computer-readable medium of claim 31 wherein when the received indication is to change the effective length of a string represented by tabulative notation, the automatically changing indicates a new location of a musical note in conventional staff notation.

46. The computer-readable medium of claim 31 wherein the automatically changing occurs after multiple indications have been received.

47. The computer-readable medium of claim 46 wherein the automatically changing occurs in response to a user indication.

48. A method in a computer system for generating a musical score, the method comprising:

displaying an indication for each of a plurality of strings;

receiving a selection of one of the displayed indications of a string;

receiving an indication of a pitch for the string corresponding to the selected indication;

and generating a musical notation for the musical score to reflect the indicated pitch for the string corresponding to the selected indication.

49. The method of claim 48 including displaying a tuning icon along with each displayed indication of a string and wherein the selection of one of the displayed indications is based on selection of a tuning icon.

* * * * *